US011886585B1

(12) United States Patent
Davis

(10) Patent No.: US 11,886,585 B1
(45) Date of Patent: Jan. 30, 2024

(54) SYSTEM AND METHOD FOR IDENTIFYING AND MITIGATING CYBERATTACKS THROUGH MALICIOUS POSITION-INDEPENDENT CODE EXECUTION

(71) Applicant: FireEye, Inc., Milpitas, CA (US)

(72) Inventor: Stephen Davis, Ashburn, VA (US)

(73) Assignee: Musarubra US LLC, Plano, TX (US)

( * ) Notice: Subject to any disclaimer, the term of this patent is extended or adjusted under 35 U.S.C. 154(b) by 530 days.

(21) Appl. No.: 16/586,794

(22) Filed: Sep. 27, 2019

(51) Int. Cl.
*G06F 21/56* (2013.01)
*G06F 11/32* (2006.01)
*G06F 21/57* (2013.01)

(52) U.S. Cl.
CPC .......... *G06F 21/566* (2013.01); *G06F 11/327* (2013.01); *G06F 21/57* (2013.01)

(58) Field of Classification Search
CPC ....... G06F 21/566; G06F 11/327; G06F 21/57
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.-mining.pdf-.

(Continued)

*Primary Examiner* — Farid Homayounmehr
*Assistant Examiner* — Suman Debnath
(74) *Attorney, Agent, or Firm* — Rutan & Tucker, LLP

(57) ABSTRACT

A computing system including a processor and a memory, which includes a first memory region operating as a kernel space and a second memory region operating as a user space. Maintained within the kernel space, a first logic unit receives a notification identifying a newly created thread and extracts at least meta-information associated with the newly created thread. Maintained within the user space, a second logic unit receives at least the meta-information associated with the newly created thread and conducts analytics on at least the meta-information to attempt to classify the newly created thread. An alert is generated by the second logic unit upon classifying the newly created thread as a cyberattack associated with a malicious position independent code execution based at least on results of the analytics associated with the meta-information associated with the newly created thread.

21 Claims, 8 Drawing Sheets

(56) References Cited

U.S. PATENT DOCUMENTS

| | | |
|---|---|---|
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |

(56) References Cited

U.S. PATENT DOCUMENTS

| | | | |
|---|---|---|---|
| 8,533,824 | B2 | 9/2013 | Hutton et al. |
| 8,539,582 | B1 | 9/2013 | Aziz et al. |
| 8,549,638 | B2 | 10/2013 | Aziz |
| 8,555,391 | B1 | 10/2013 | Demir et al. |
| 8,561,177 | B1 | 10/2013 | Aziz et al. |
| 8,566,476 | B2 | 10/2013 | Shiffer et al. |
| 8,566,946 | B1 | 10/2013 | Aziz et al. |
| 8,584,094 | B2 | 11/2013 | Dadhia et al. |
| 8,584,234 | B1 | 11/2013 | Sobel et al. |
| 8,584,239 | B2 | 11/2013 | Aziz et al. |
| 8,595,834 | B2 | 11/2013 | Xie et al. |
| 8,627,476 | B1 | 1/2014 | Satish et al. |
| 8,635,696 | B1 | 1/2014 | Aziz |
| 8,682,054 | B2 | 3/2014 | Xue et al. |
| 8,682,812 | B1 | 3/2014 | Ranjan |
| 8,689,333 | B2 | 4/2014 | Aziz |
| 8,695,096 | B1 | 4/2014 | Zhang |
| 8,713,631 | B1 | 4/2014 | Pavlyushchik |
| 8,713,681 | B2 | 4/2014 | Silberman et al. |
| 8,726,392 | B1 | 5/2014 | McCorkendale et al. |
| 8,739,280 | B2 | 5/2014 | Chess et al. |
| 8,776,229 | B1 | 7/2014 | Aziz |
| 8,782,792 | B1 | 7/2014 | Bodke |
| 8,789,172 | B2 | 7/2014 | Stolfo et al. |
| 8,789,178 | B2 | 7/2014 | Kejriwal et al. |
| 8,793,278 | B2 | 7/2014 | Frazier et al. |
| 8,793,787 | B2 | 7/2014 | Ismael et al. |
| 8,805,947 | B1 | 8/2014 | Kuzkin et al. |
| 8,806,647 | B1 | 8/2014 | Daswani et al. |
| 8,832,829 | B2 | 9/2014 | Manni et al. |
| 8,850,570 | B1 | 9/2014 | Ramzan |
| 8,850,571 | B2 | 9/2014 | Staniford et al. |
| 8,881,234 | B2 | 11/2014 | Narasimhan et al. |
| 8,881,271 | B2 | 11/2014 | Butler, II |
| 8,881,282 | B1 | 11/2014 | Aziz et al. |
| 8,898,788 | B1 | 11/2014 | Aziz et al. |
| 8,935,779 | B2 | 1/2015 | Manni et al. |
| 8,949,257 | B2 | 2/2015 | Shiffer et al. |
| 8,984,638 | B1 | 3/2015 | Aziz et al. |
| 8,990,939 | B2 | 3/2015 | Staniford et al. |
| 8,990,944 | B1 | 3/2015 | Singh et al. |
| 8,997,219 | B2 | 3/2015 | Staniford et al. |
| 9,009,822 | B1 | 4/2015 | Ismael et al. |
| 9,009,823 | B1 | 4/2015 | Ismael et al. |
| 9,027,135 | B1 | 5/2015 | Aziz |
| 9,071,638 | B1 | 6/2015 | Aziz et al. |
| 9,104,867 | B1 | 8/2015 | Thioux et al. |
| 9,106,630 | B2 | 8/2015 | Frazier et al. |
| 9,106,694 | B2 | 8/2015 | Aziz et al. |
| 9,118,715 | B2 | 8/2015 | Staniford et al. |
| 9,159,035 | B1 | 10/2015 | Ismael et al. |
| 9,171,160 | B2 | 10/2015 | Vincent et al. |
| 9,176,843 | B1 | 11/2015 | Ismael et al. |
| 9,189,627 | B1 | 11/2015 | Islam |
| 9,195,829 | B1 | 11/2015 | Goradia et al. |
| 9,197,664 | B1 | 11/2015 | Aziz et al. |
| 9,223,972 | B1 | 12/2015 | Vincent et al. |
| 9,225,740 | B1 | 12/2015 | Ismael et al. |
| 9,241,010 | B1 | 1/2016 | Bennett et al. |
| 9,251,343 | B1 | 2/2016 | Vincent et al. |
| 9,262,635 | B2 | 2/2016 | Paithane et al. |
| 9,268,936 | B2 | 2/2016 | Butler |
| 9,275,229 | B2 | 3/2016 | LeMasters |
| 9,282,109 | B1 | 3/2016 | Aziz et al. |
| 9,292,686 | B2 | 3/2016 | Ismael et al. |
| 9,294,501 | B2 | 3/2016 | Mesdaq et al. |
| 9,300,686 | B2 | 3/2016 | Pidathala et al. |
| 9,306,960 | B1 | 4/2016 | Aziz |
| 9,306,974 | B1 | 4/2016 | Aziz et al. |
| 9,311,479 | B1 | 4/2016 | Manni et al. |
| 9,355,247 | B1 | 5/2016 | Thioux et al. |
| 9,356,944 | B1 | 5/2016 | Aziz |
| 9,363,280 | B1 | 6/2016 | Rivlin et al. |
| 9,367,681 | B1 | 6/2016 | Ismael et al. |
| 9,372,989 | B2 * | 6/2016 | Grystan ............... G06F 21/56 |
| 9,398,028 | B1 | 7/2016 | Karandikar et al. |
| 9,413,781 | B2 | 8/2016 | Cunningham et al. |
| 9,426,071 | B1 | 8/2016 | Caldejon et al. |
| 9,430,646 | B1 | 8/2016 | Mushtaq et al. |
| 9,432,389 | B1 | 8/2016 | Khalid et al. |
| 9,438,613 | B1 | 9/2016 | Paithane et al. |
| 9,438,622 | B1 | 9/2016 | Staniford et al. |
| 9,438,623 | B1 | 9/2016 | Thioux et al. |
| 9,459,901 | B2 | 10/2016 | Jung et al. |
| 9,467,460 | B1 | 10/2016 | Otvagin et al. |
| 9,483,644 | B1 | 11/2016 | Paithane et al. |
| 9,495,180 | B2 | 11/2016 | Ismael |
| 9,497,213 | B2 | 11/2016 | Thompson et al. |
| 9,507,935 | B2 | 11/2016 | Ismael et al. |
| 9,516,057 | B2 | 12/2016 | Aziz |
| 9,519,782 | B2 | 12/2016 | Aziz et al. |
| 9,536,091 | B2 | 1/2017 | Paithane et al. |
| 9,537,972 | B1 | 1/2017 | Edwards et al. |
| 9,560,059 | B1 | 1/2017 | Islam |
| 9,565,202 | B1 | 2/2017 | Kindlund et al. |
| 9,591,015 | B1 | 3/2017 | Amin et al. |
| 9,591,020 | B1 | 3/2017 | Aziz |
| 9,594,904 | B1 | 3/2017 | Jain et al. |
| 9,594,905 | B1 | 3/2017 | Ismael et al. |
| 9,594,912 | B1 | 3/2017 | Thioux et al. |
| 9,609,007 | B1 | 3/2017 | Rivlin et al. |
| 9,626,509 | B1 | 4/2017 | Khalid et al. |
| 9,628,498 | B1 | 4/2017 | Aziz et al. |
| 9,628,507 | B2 | 4/2017 | Haq et al. |
| 9,633,134 | B2 | 4/2017 | Ross |
| 9,635,039 | B1 | 4/2017 | Islam et al. |
| 9,641,546 | B1 | 5/2017 | Manni et al. |
| 9,654,485 | B1 | 5/2017 | Neumann |
| 9,661,009 | B1 | 5/2017 | Karandikar et al. |
| 9,661,018 | B1 | 5/2017 | Aziz |
| 9,674,298 | B1 | 6/2017 | Edwards et al. |
| 9,680,862 | B2 | 6/2017 | Ismael et al. |
| 9,690,606 | B1 | 6/2017 | Ha et al. |
| 9,690,933 | B1 | 6/2017 | Singh et al. |
| 9,690,935 | B2 | 6/2017 | Shiffer et al. |
| 9,690,936 | B1 | 6/2017 | Malik et al. |
| 9,736,179 | B2 | 8/2017 | Ismael |
| 9,740,857 | B2 | 8/2017 | Ismael et al. |
| 9,747,446 | B1 | 8/2017 | Pidathala et al. |
| 9,756,074 | B2 | 9/2017 | Aziz et al. |
| 9,773,112 | B1 | 9/2017 | Rathor et al. |
| 9,781,144 | B1 | 10/2017 | Otvagin et al. |
| 9,787,700 | B1 | 10/2017 | Amin et al. |
| 9,787,706 | B1 | 10/2017 | Otvagin et al. |
| 9,792,196 | B1 | 10/2017 | Ismael et al. |
| 9,824,209 | B1 | 11/2017 | Ismael et al. |
| 9,824,211 | B2 | 11/2017 | Wilson |
| 9,824,216 | B1 | 11/2017 | Khalid et al. |
| 9,825,976 | B1 | 11/2017 | Gomez et al. |
| 9,825,989 | B1 | 11/2017 | Mehra et al. |
| 9,838,408 | B1 | 12/2017 | Karandikar et al. |
| 9,838,411 | B1 | 12/2017 | Aziz |
| 9,838,416 | B1 | 12/2017 | Aziz |
| 9,838,417 | B1 | 12/2017 | Khalid et al. |
| 9,846,776 | B1 | 12/2017 | Paithane et al. |
| 9,876,701 | B1 | 1/2018 | Caldejon et al. |
| 9,888,016 | B1 | 2/2018 | Amin et al. |
| 9,888,019 | B1 | 2/2018 | Pidathala et al. |
| 9,910,988 | B1 | 3/2018 | Vincent et al. |
| 9,912,644 | B2 | 3/2018 | Cunningham |
| 9,912,681 | B1 | 3/2018 | Ismael et al. |
| 9,912,684 | B1 | 3/2018 | Aziz et al. |
| 9,912,691 | B2 | 3/2018 | Mesdaq et al. |
| 9,912,698 | B1 | 3/2018 | Thioux et al. |
| 9,916,440 | B1 | 3/2018 | Paithane et al. |
| 9,921,978 | B1 | 3/2018 | Chan et al. |
| 9,934,376 | B1 | 4/2018 | Ismael |
| 9,934,381 | B1 | 4/2018 | Kindlund et al. |
| 9,946,568 | B1 | 4/2018 | Ismael et al. |
| 9,954,890 | B1 | 4/2018 | Staniford et al. |
| 9,973,531 | B1 | 5/2018 | Thioux |
| 10,002,252 | B2 | 6/2018 | Ismael et al. |
| 10,019,338 | B1 | 7/2018 | Goradia et al. |
| 10,019,573 | B2 | 7/2018 | Silberman et al. |

(56) References Cited

U.S. PATENT DOCUMENTS

| | | |
|---|---|---|
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0259967 A1* | 11/2006 | Thomas ............. H04L 63/145 726/22 |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |

(56) References Cited

U.S. PATENT DOCUMENTS

| | | |
|---|---|---|
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255014 A1* | 10/2012 | Sallam ............... G06F 21/564 726/24 |

(56) References Cited

U.S. PATENT DOCUMENTS

| | | |
|---|---|---|
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0101044 A1* | 4/2015 | Martin ................ G06F 21/552 726/22 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0326592 A1* | 11/2015 | Vissamsetty .......... H04L 63/145 726/24 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0124327 A1* | 5/2017 | Kumbhar ................ G06F 9/545 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0156027 A1* | 5/2019 | Dabak .................... G06F 21/56 |
| 2020/0210591 A1* | 7/2020 | Monastyrsky ...... G06F 9/45558 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector-Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag-An advanced network forensic framework", Digital investigation 5, Elsevier, (2008), pp. S112-S120.

(56) References Cited

OTHER PUBLICATIONS

Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM AND METHOD FOR IDENTIFYING AND MITIGATING CYBERATTACKS THROUGH MALICIOUS POSITION-INDEPENDENT CODE EXECUTION

FIELD

Embodiments of the disclosure relate to the field of cybersecurity. More specifically, one embodiment of the disclosure relates to an improved system and method for detecting cyberattacks conducted through remote injection or local reflection.

GENERAL BACKGROUND

Process injection is a method of injecting code (e.g., executable, dynamic link library "DLL", etc.) into a running process. In many situations, process injection may be done for legitimate reasons. However, for over a decade, process injection has become a common attack vector for cyberattacks, particularly on user operated endpoint devices because process injection used to inject shellcode (i.e., code used for malicious purposes), can readily employ detection evasion techniques to camouflage its malicious code within a running process and, at a later time, gain access to certain resources. The running process itself may provide the injected, malicious code with access to certain resources (e.g., particular memory, enhanced privileges, etc.), thereby improving the chances of a successful cyberattack. For example, a malicious DLL may be stealthily injected into a running process to establish a "hidden" socket connection. Thereafter, the malicious code may perpetuate activities for financial gain or to embarrass, harass or blackmail the user such as gaining access to and exfiltrating sensitive or confidential information from a user's endpoint device, or even to perpetuate a disruptive cyberattack.

Conventional security systems are configured to examine processes operating on the endpoint device and their effects on resources to identify malicious processes. For example, the Windows® operating system (OS) is currently configured with "Event Tracing for Windows (ETW)," namely a diagnostic tool that is configured to trace and log events that are conducted by user processes produced during the execution of user-mode applications and kernel-mode drivers. In particular, ETW collects information associated with detected events (e.g., new thread creation), which is stored into a log file residing in the user space for later evaluation. However, the process injection analytics are performed in user space and malicious threads are frequently terminated soon after execution.

Accordingly, in some situations, ETW might not have access to salient meta-information that could prove useful in detecting malicious code execution. As a result, ETW has been plagued by high rates of false positives and false negatives, suggesting that a more reliable system for detecting malicious code execution is needed.

BRIEF DESCRIPTION OF THE DRAWINGS

Embodiments of the invention are illustrated by way of example and not by way of limitation in the figures of the accompanying drawings, in which like references indicate similar elements and in which.

Figure 1A:
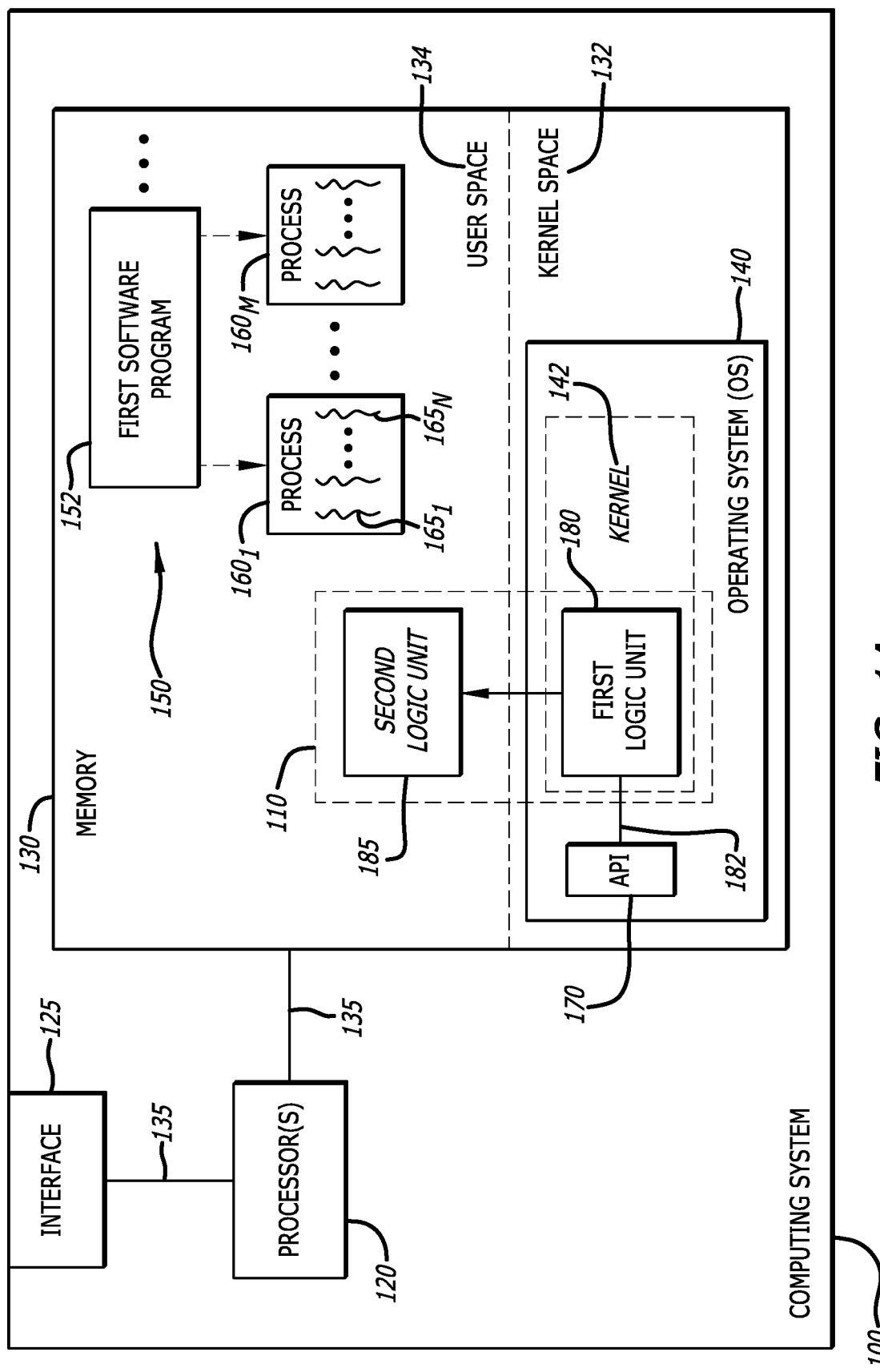
FIG. 1A is a first illustrative exemplary architecture of a computing system operating as an endpoint device deploying a first embodiment of cyberthreat analytic logic for identifying malicious code execution.

Elements in these figures are illustrated for simplicity and clarity, and thus, all elements forming the systems described below have not necessarily been included. For example, common, but well-understood, elements that are useful or necessary in a commercially feasible embodiment are often not depicted in order to facilitate a less obstructed view of these various embodiments of the disclosure.

DETAILED DESCRIPTION

To improve security of a computing system, cyberthreat analytic logic has been developed to accurately detect a cybersecurity threat (cyberthreat) involving malicious position independent code execution. Herein, "malicious, position-independent code execution" broadly pertains to (i) malicious remote (code) injection in which malicious code is associated with a thread inserted into a process currently in operation and/or (ii) malicious local reflection in which a malicious thread is created and invoked by the same process. Herein, a "process" may correspond to an executing instance associated with certain functionality supported by a software program such as a software application for example. A "thread" generally includes a subset of instructions and shares resources of the process with other threads. Whether created through remote injection or through local reflection, on, the cyberthreat analytic logic analyzed each thread to evaluate whether it furthers a cyberattack.

According to one embodiment of the disclosure, the above-identified cyberthreat analytic logic is configured to operate on a computing system. An illustrative example of a computing system includes an endpoint device or a cloud network (or service) for example, although a computing system may correspond to any system architecture that includes one or more processors and a memory. This memory, when abstracted as a virtualized storage resource, may be segmented into a kernel space and a user space. The cyberthreat analytic logic includes logic that may be implemented as computer program code stored during deployment within the kernel space and the user space.

More specifically, according to one embodiment of the disclosure, the cyberthreat analytic logic features a first logic unit and a second logic unit. The first logic unit is configured to detect and collect information associated with one or more newly created threads during execution of user process(es). The second logic unit is configured to conduct analyses on the collected information to determine whether any of these newly created thread(s) is associated with malicious position independent code execution. Herein, the creation of a thread caused by malicious position independent code execution is referred to as a "malicious code execution event." For example, a malicious code execution event may correspond to injection of code into a process identified by a targeted handle or a linking of a DLL, which is accessed by content within a particular process. Also, for brevity sake, "malicious position-independent code execution" may be generally referred to herein as "malicious code execution."

According to one embodiment of the disclosure, the first logic unit is maintained within kernel space of the memory and operates as a kernel driver. The second logic unit, operating as a security agent, is maintained within the user space of the memory. By implementing the first logic unit within the kernel space and the second logic unit within the user space, the cyberthreat analytic logic achieves improved accuracy and reliability (e.g., reduction in false positives and/or false negatives) through enhanced control of the operability of the computing system, as operations of the thread under inspection cannot be terminated prior to termination of the first logic unit, assisting in the collection of meta-information and code associated with newly created threads. Alternatively, it is contemplated that the first logic unit may conduct a preliminary analysis of the meta-information and/or code to determine whether to pass the meta-information and/or code to the second logic unit (e.g., pass when the meta-information has a certain likelihood of being malicious).

For this embodiment of the disclosure, the first logic unit may be configured to detect threads that are newly created during execution of a user process. Besides detecting newly created threads, the first logic unit may be further configured to disregard a certain type or certain types of newly created threads from further analysis. As an illustrative example, the first logic unit may exclude one type of thread, such as system threads (e.g., threads created in the kernel space) for example, thereby performing analytics on information associated with a reduced set (e.g., one or more) of newly created threads. The first logic unit may further gather meta-information associated with each thread of the reduced set of newly created threads as well as the code associated with each thread of the reduced set of newly created threads.

Stated differently, according to one embodiment of the disclosure, the first logic unit may be configured to (i) detect newly created threads, (ii) filter certain type(s) of threads (e.g., system threads, etc.) from these detected threads to produce the reduced set of newly created threads, and (iii) acquire meta-information associated with each thread of the reduced set of newly created threads. According to one embodiment of the disclosure, upon registration with a particular component of a Windows® Operating System (OS), such as a specific Windows® Application Programming Interface (API) for example, the first logic unit may receive a thread create notification (e.g., thread notification callback) in response to creation of a new thread. Each thread create notification may include meta-information associated with its corresponding newly created thread, where portions of this meta-information may be analyzed by both the first logic unit in conducting filtering operations and the second logic unit in determining whether the newly created thread is invoked to conduct a cyberattack based on malicious code execution.

More specifically, upon detecting one or more newly created threads, the first logic unit (kernel driver) is configured to perform one or more filtering operations to eliminate certain types of threads, resulting in a reduced set of newly created threads to be subsequently analyzed. With respect to a first filtering operation, the first logic unit may be configured to monitor for newly created threads based on the locality of its source. For example, the first logic unit may be configured to monitor for newly created threads based on different filtering levels: new threads created by another process (remote injection), new threads created by the same process (local reflection), or both of these new thread types. Thus different filtering levels may be used to concentrate or expand analytics to particular thread type(s).

"Remote injection" occurs when a bad actor uses an already running process by inserting a thread (e.g., a subset of instructions) from a particular process into the running user process. The thread may correspond to malicious code inserted into memory associated with the user process or a changed path of execution inserted into the user process. Hence, a remote injection event, being one type of malicious code execution event, may be detected by the first logic unit when a source process identifier (PID) associated with a newly created thread differs from its destination PID. Similarly, "local reflection" occurs when a process includes code that attempts to allocate memory and inject new functionality without transferring to another process. For example, reflective DLL injection operates by creating a DLL that maps itself into memory when executed, instead of relying on the Windows® loader. Herein, a local reflection event, being another type of malicious code execution event, may be detected by the first logic unit when the source PID matches its destination PID. The source PID and destination PID for a newly created thread may be provided as information within the thread create notification associated with that thread.

With respect to a second filtering operation, the first logic unit may be configured to identify whether a newly created thread was created in kernel space or in user space. In particular, the first logic unit may extract and evaluate the value of the source PID to determine whether the new thread is created in the kernel space or user space in memory. For a Windows® OS, a thread is identified as being created in the kernel space when the source PID is assigned a certain prescribed value. Therefore, the first logic unit may disregard information associated with newly created threads with source PIDs that identify the thread as created in the kernel space.

The first logic unit further acquires meta-information associated with each thread of the reduced set of newly created threads. For each thread, the meta-information may include, but is not limited or restricted to the following: (a) information identifying what permissions are assigned to a newly created thread, (b) a start address for the newly created thread, (c) a size of memory allocated to the newly created thread, or the like. Using the start address and the thread allocated memory size, as an optional capability, the first logic unit may be further configured to copy (and store) contents within the memory allocated to the particular newly created thread in order to acquire code associated with that thread (hereinafter referred to as "thread code"). The same operations can be performed for each thread of the reduced set of newly created threads. As the acquisition of the meta-information and/or thread code is performed by the first logic unit operating as a kernel driver, the fetching of such meta-information and/or thread code is ensured as, according to Windows® OS functionality, the newly created thread cannot terminate prior to termination of operability of the kernel driver.

In particular, the first logic unit may be configured to retrieve code associated with each thread of the reduced set of newly created threads ("thread code"). During malicious code execution, the thread code may correspond to shellcode, namely a collection of position independent code that an attacker has curated and compiled that may be processed without requiring the code to be loaded by a Windows®-based loader. As an illustrative example, if operating as shellcode, the thread code may be code with the intent to perpetuate malicious or criminal activities (broadly referred to as "malware"). These malicious activities may involve the use of software, one or more commands, or other data to take advantage of resources available to a user process associated with the newly created thread or even a vulnerability associated with a remote user process.

Operating in user (memory) space and determining whether a detected code execution event is malicious, the second logic unit may be configured to receive the meta-information associated with each thread belonging to the reduced set of the newly created threads along with its corresponding thread code (e.g., entire thread code or one or more portions thereof). For instance, according to one embodiment of the disclosure, the first logic unit conducts one or more analyses of the meta-information (and/or thread code) for each newly created thread, where the analyses may, at least in part, determine whether a particular level of correlation exists between the meta-information (and/or thread code) associated with each newly created thread and contents within one or more blacklists and/or whitelists. Upon determining that the correlation between the meta-information associated with each newly created thread and content within any of the one or more blacklists (e.g., identical or comparison greater than the prescribed degree of similarity) meets or exceeds the particular level of correlation, the second logic unit may classify the newly created thread is involved in a cyberattack and issue an alert identifying that a malicious code execution is being conducted on the endpoint device.

More specifically, according to one embodiment of the disclosure, the second logic unit may conduct analytics to determine whether at least a particular level of correlation (first threshold) exists between at least a portion of the meta-information and contents within a first blacklist and/or a first whitelist. For example, as the first blacklist includes meta-information associated with known malicious code execution events, the second logic unit may classify the thread represented by the meta-information is part of a cybersecurity attack when the correlation between the meta-information and contents within the first blacklist meets or exceeds the first threshold. Optionally, as the first whitelist may include meta-information associated with known, non-malicious code execution events such as injection of a DLL to change operability of an input/output (I/O) device such as a mouse or injection of a DLL into a process to monitor hooking operations. The second logic unit may classify the thread represented by the meta-information as non-malicious (benign) code when the correlation between the meta-information and contents within the first whitelist exceeds a first prescribed threshold (e.g., first threshold or a higher/lower threshold). In the event that there is no correlation between the meta-information and the contents of the first blacklist and whitelist, the thread is deemed suspicious (or indefinite), which may lead to an analysis of the thread code or further analysis by a remote source.

Similarly, the second logic unit may determine whether a specific level of correlation (second threshold) exists between a representation of the thread code and content within a second blacklist and/or a second whitelist. According to one embodiment of the disclosure, the representation of the thread code may be a hash value such as a MD5 or SHA-256 value, a checksum, or another data format having a consistent size regardless of the byte size of the thread code. Alternatively, the representation of the thread code may be one or more portions of the thread code extracted from the entirety of the thread code. As a result, the content within the second blacklist and/or the second white list may include corresponding representations of shellcode associated with known, malicious code execution and/or corresponding representations of code associated with non-malicious code execution, respectively. The selected shellcode and/or code may be determined through machine learning, experiential knowledge, artificial intelligence-based results, or the like.

Similar to the analyses of the meta-information, as the second blacklist includes known shellcode, the second logic unit may classify the thread (represented by the thread code) is part of a cyberattack when the correlation between the thread code and the known shellcode exceeds a second prescribed threshold. The second prescribed threshold may be equivalent to the first threshold or may be adjusted (higher/lower) to accommodate the user's security risk tolerance. Optionally, as the second whitelist may include meta-information associated with known, non-malicious code, the second logic unit may classify the thread represented by the thread code as non-malicious (benign) code when the correlation between the thread code and contents within the second whitelist exceeds a third prescribed threshold (e.g., second threshold or higher/lower).

With respect to the computerized method for detecting malicious code execution, a first operation is conducted by the first logic unit, such as a kernel driver being part of the cyberthreat analytic logic for example, to detect newly created threads for one or more processes executing on a computing system (e.g., endpoint device, cloud network/service, etc.). According to one embodiment of the disclosure, one or more filtering operations may be conducted on the detected, newly created threads by filtering logic deployed within the kernel driver. The filtering operations produce a reduced set of newly created threads.

The kernel driver continues analyses of the reduced set of newly created threads by collecting meta-information associated with each of the detected threads, namely characteristics such as the locality of the creation of that thread (e.g., DLL location versus a user allocated memory), access permissions, memory allocation size for the thread, starting address for memory allocated for the thread, or the like. The kernel driver may include a heuristics engine to apply heuristics (rules based on the experiential knowledge and prior analyses of known malware) to collect and detect the particular meta-information for use in determining whether the newly created thread is malicious (and associated with a cyberattack) or benign. Additionally, using a portion of the collected meta-information, the kernel driver may be configured to further collect the thread code (i.e., code associated with the newly created thread). Both the meta-information along with the thread code are provided to the second logic unit, operating as a security agent.

According to one embodiment of the disclosure, the "security agent" may be an instance of a software component, which is instrumented as part of or operating in conjunction with the Windows® OS software and configured to conduct malware detection by at least analyzing incoming information from the kernel driver. As an illustrative example, the security agent may collect and compare meta-information (e.g., one or more portions of the collected meta-information) to meta-information associated with known malicious code execution events. Additionally, the security agent may collect and compare a representation of the thread code to a plurality of representations of shellcode in order to provide an additional analytic point to detect a malicious code execution event, where this additional analysis point further reduces the presence of false positives (FPs) and false negatives (FNs). The security agent generates a "threat score," namely a value that represents a likelihood of a thread under analysis being part of a cyberattack based on malicious (position-independent) code execution.

More specifically, the security agent receives the meta-information and/or thread code related to the "suspicious" newly created thread from the kernel driver. The security agent conducts additional analyses of the meta-information and/or thread code to determine, based on determined threat score(s) for example, whether any of this information identifies that the thread is part of a cyberattack based on malicious code execution. Herein, according to one embodiment, the malicious code execution may be determined based on a comparison of meta-information associated with the newly created thread to meta-information associated with known malicious code execution events. The malicious (position-independent) code execution may be further confirmed based on an analysis of a representation of the thread code to representations of known shellcode.

Where the newly created thread is determined to be part of a cyberattack, an alert is triggered. The alert may operate as a warning of the detection of malicious thread injection, such as issuance of a dashboard warning to a security administrator and/or issuance of the same or different type of warning (e.g., pop-up message, text message, etc.) to the endpoint device user. Moreover, the information collected during the above-identified analyses (e.g., meta-information, shellcode, etc.) may be used to determine an identity of threat actors behind the cyberattack. Threat actors may be identifiable based on specifics associated with their cyber-attack efforts, such as the uncovered shellcode may have been used by a particular threat actor in another attempted cyberattack previously attributed to that threat actor.

Where the newly created thread is determined, based on the meta-information and/or thread code, to be part of a cyberattack based on malicious code execution, the second logic unit may trigger a remediation operation to occur. The type of remediation selected may be dependent on the threat score(s) representing a likelihood of maliciousness for a newly created thread.

For instance, when a threat score assigned to the thread by thread classification logic within the security agent exceeds a first threshold denoting that the thread is malicious, the alert may trigger an automated remediation, e.g., by terminating the process associated with the malicious thread (or blocking further activities by the malicious thread). However, where the threat score assigned by the thread classification logic exceeds a second threshold (less than the first threshold but still denotes the thread is malicious), the alert may cause the dashboard warning and prompt an analyst to review the results and determine whether or not to initiate a remediation operation. However, where the threat score assigned to the thread by the thread classification logic exceeds a third threshold (less than the second threshold but still denotes the thread is malicious), the alert may cause the dashboard warning and rely on remediation to be conducted by the administrator based on security protocols set by the enterprise or user associated with the endpoint device.

If the suspicious thread is determined to be benign by the security agent (e.g., based on additional information available to the agent such as signatures, other indicators-of-compromise (IOCs), etc.), further analysis of the meta-information and/or thread code associated with the thread under analysis may be discontinued. However, if the security agent continues to classify the thread as "suspicious" (e.g., the threat classification of the newly created thread cannot yet be confirmed as "malicious" or "benign"), the security agent may be configured to provide the meta-information and the thread code to a centralized system (e.g., third party security server), which is communicatively coupled directly or remotely to the computing system via a network connection. The centralized system is configured to perform an emulation operation or other in-depth analyses on the meta-information and/or the thread code in order analyze the potential effects to the computing system (and network) if the thread code had been executed.

I. Terminology

In the following description, certain terminology is used to describe aspects of the invention. In certain situations, each of the terms "logic," "logic unit," "component," and "system" is representative of hardware, firmware, and/or software that is configured to perform one or more functions. As hardware, the logic (or logic unit/component/system) may include one or more processors (referred to herein as "processor") and/or a memory. Examples of a processor may include, but are not limited or restricted to a microprocessor, one or more processor cores, a programmable gate array, a microcontroller, an application specific integrated circuit, or any virtual representation of the processor, namely software that is coded to function the same as or similar to the physical processor. Similarly, examples of a memory may include, but are not limited or restricted to any type of volatile or non-volatile memory, or any virtual representation of the memory being software that is coded to function the same as or similar to the physical memory.

Alternatively, or in combination with the hardware circuitry described above, the logic (or logic unit/component/system) may be software in the form of one or more software modules. The software modules may include an executable application, a daemon application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

A "computing system" generally refers to a physical electronic device featuring a processor, memory, and/or network connection or a virtual electronic device with this functionality. Examples of a computing system may include, but are not limited or restricted to any physical or virtual resource operating as a server, an endpoint device (e.g., a desktop or laptop computer, a wearable, a tablet, a device-installed mobile software, management console, industrial controller, info-entertainment system, etc.), a network adapter, or an intermediary communication device (e.g., router, firewall, etc.), a cloud service, or the like.

The term "meta-information" generally refers to a collection of information about (e.g., associated with) a thread for example. Examples of the meta-information may include, but are not limited or restricted to the following: (i) thread permission and/or (ii) thread execution address range.

The term "message" generally refers to signaling as information placed in a prescribed format and may be transmitted between different components. For instance, a message may be a Windows® messages or Windows® API.

The term "computerized" generally represents that any corresponding operations are conducted by hardware in combination with software and/or firmware.

In certain instances, the terms "compare," comparing," "comparison," or other tenses thereof generally mean determining if a match (e.g., identical or a prescribed level of correlation) is achieved between two items where one of the items may include content pertaining to meta-information that is associated with an email message being analyzed.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The following description is not to be taken in a limiting sense, but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

As this invention is susceptible to embodiments of many different forms, it is intended that the present disclosure is to be considered as an example of the principles of the invention and not intended to limit the invention to the specific embodiments shown and described.

II. Cyberthreat Analytic Logic Deployments

Referring to FIG. 1A, a first illustrative architecture of a computing system 100 deploying cyberthreat analytic logic 110 for identifying malicious (position-independent) code execution is shown. Operating as an endpoint device, the computing system 100 includes one or more processors 120, an interface 125 and a memory 130, which are communicatively coupled together over transmission medium 135. The cyberthreat analytic logic 110 is implemented within the memory 130 and is configured, when in operation, to detect, report and potentially mitigate cyberattacks based on malicious code execution. The cyberthreat analytic logic 110 includes a first logic unit 180 and a second logic unit 185, described below.

As shown in FIG. 1A, the memory 130 is configured to maintain software including an operating system (OS) 140 and one or more user software components 150 (e.g., program, application, plug-in, macro, or script). Herein, the operation system (OS) 140 includes a kernel 142, namely software that controls operations of the computing system 100. As referred to herein, the "kernel" 142 may include the privileged OS kernel, kernel extensions, and/or certain kernel drivers. In particular, the kernel 142 resides in a first (protected) area 132 of the memory 130 (referred to as "kernel space") and is configured to perform critical tasks, such as running processes and handling interrupts for example, in this protected kernel space 132.

As further shown, the memory 130 further stores software 150, which reside within a second area 134 of the memory 130 (referred to as "user space"). Of the software 150, a first software program 152, when executed by the processor(s) 120, may invoke one or more user processes $160_1$-$160_m$ (M≥1). Each of the user processes $160_1$-$160_m$ may correspond to an executing instance of a program that performs certain functionality exhibited by the computing system 100 (e.g., input/output, file system management, etc.) in contrast to the kernel 142 that manages the individual user processes $160_1$-$160_m$ within the user space 134 Each user process can access the portion of memory allocated to the process but cannot access the portion of memory allocated to other processes unless explicitly allowed. These user processes $160_1$-$160_m$ may be automatically launched or manually launched by the user, and after being launched, some or all of the user processes $160_1$-$160_m$ may operate sequentially or concurrently (i.e., at least partially overlapping in time) with each other.

Referring still to FIG. 1A, at least one of the user processes $160_1$-$160_m$ (e.g., process $160_1$) may include one or more threads $165_1$-$165_N$ (N≥1), which collectively operate to provide the certain functionality offered by the process $160_1$. Each of the threads $165_1$-$165_N$ may share resources utilized by the process $160_1$ such as a region of the memory 130 allocated to the process $160_1$ for example. According to one embodiment of the disclosure, one or more of the threads $165_1$-$165_N$ may be created during execution of the process $160_1$ and/or may be created at another process $160_m$ and injected to the memory region allocated for the running process $160_1$.

Within the kernel space 132, an Application Programming Interface (API) 170 provides a mechanism to issue a thread creation notification 182 to the first logic unit 180 in response to creation of a new thread (e.g., thread $165_1$) that occurs during execution of the process $160_1$. The thread create notification 182 may correspond to a thread notification callback that provides the first logic unit 180 with meta-information associated with the newly created thread (e.g., thread $165_1$) such as a PD. Additionally, other meta-information associated with the thread $165_1$ (e.g., thread permissions, thread addressing information, allocated memory size allocated to the thread $165_1$, etc.) may be acquired by accessing certain Windows-based data structures. Thereafter, a portion of this collection of meta-information associated with the thread $165_1$ may be useful in determining whether the new thread $165_1$ was created in either the kernel space 132 or the user space 134 of the memory 130 and whether the thread $165_1$ is part of a malicious code execution cyberattack.

A second logic unit 185, also referred to as a "security agent," is installed within the user space 134. The second logic unit 185 may be implemented as an instance of a software component that is instrumented for communications with the first logic unit 180 (e.g., kernel driver) and for conducting malware detection, notably detection of a malicious code execution event. For such detection, the second logic unit 185 may collect and determine whether a suitable level of correlation exists between the meta-information associated with the thread $165_1$ and meta-information associated with known malicious code execution events (i.e., these events are stored in memory and may be accessed as a shared resource). If this level of correlation is reached or exceeded, the thread $165_1$ is associated with a cyberattack involving malicious code execution. A similar analysis of the code associated with the thread $165_1$ may be accessed based on the thread create notification 182 to provide additional analytics to confirm a malicious process execution event, where these additional analytics may further reduce an occurrence of a false positive (FP) or a false negative (FN).

Figure 1B:
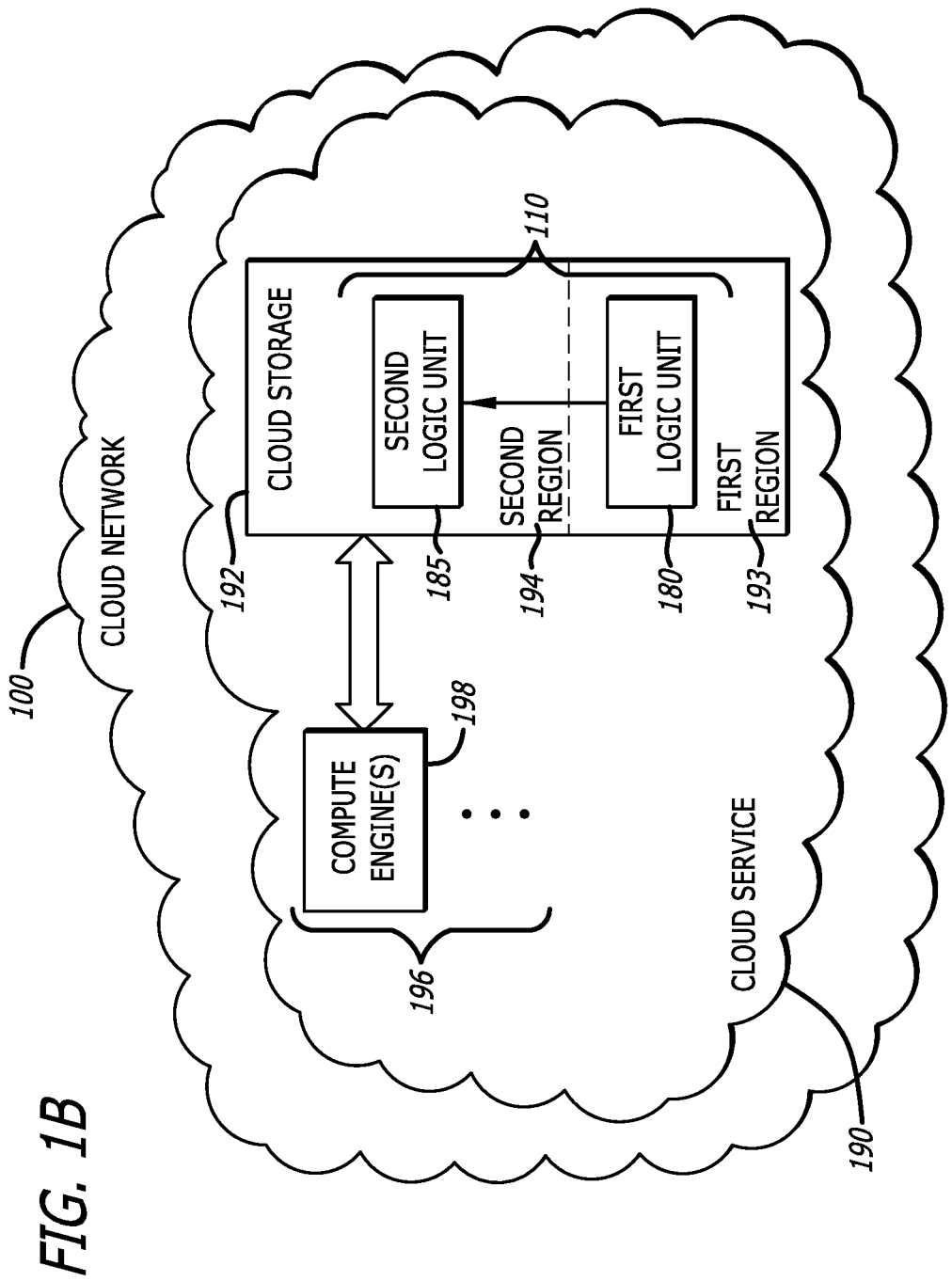
FIG. 1B is a second illustrative exemplary architecture of the computing system operating as a cloud service deploying a second embodiment of the cyberthreat analytic logic for identifying malicious code execution.

Referring now to FIG. 1B, a second illustrative architecture of the computing system 100 deploying the cyberthreat analytic logic 110 for identifying malicious code execution is shown. For this embodiment, the computing system 100 is deployed as a cloud network 100 such as a private cloud network or a public cloud network for example. The cloud network 100 includes a cloud service 190 featuring a second embodiment of the cyberthreat analytic logic 110 used for detection (and potential remediation) of malicious code execution events.

Herein, the cyberthreat analytic logic 110 features the first logic unit 180 and the second logic unit 185, which are deployed as software components maintained with cloud storage 192 (e.g., S3 storage where the cloud service 190 is offered by a public cloud network such as Amazon Web Services "AWS," etc.). The first logic unit 180 is deployed within a first region 193 of the cloud storage 192, and thus, afforded full or substantial access permissions to memory available in the cloud storage 192 (corresponding to the kernel space 132). The second logic unit 185, deployed with a second region 194 of the cloud storage 192, is afforded lesser access permissions than the first logic unit 180 (corresponding to the user space 134). According to this embodiment of the disclosure, the processor(s) 120 of the cloud network 100 may corresponding to a virtual processor 196 such as one or more compute engines (CE) 198 provided as part of AWS.

III. Cyberthreat Analytic Logic Operability

Figure 2:
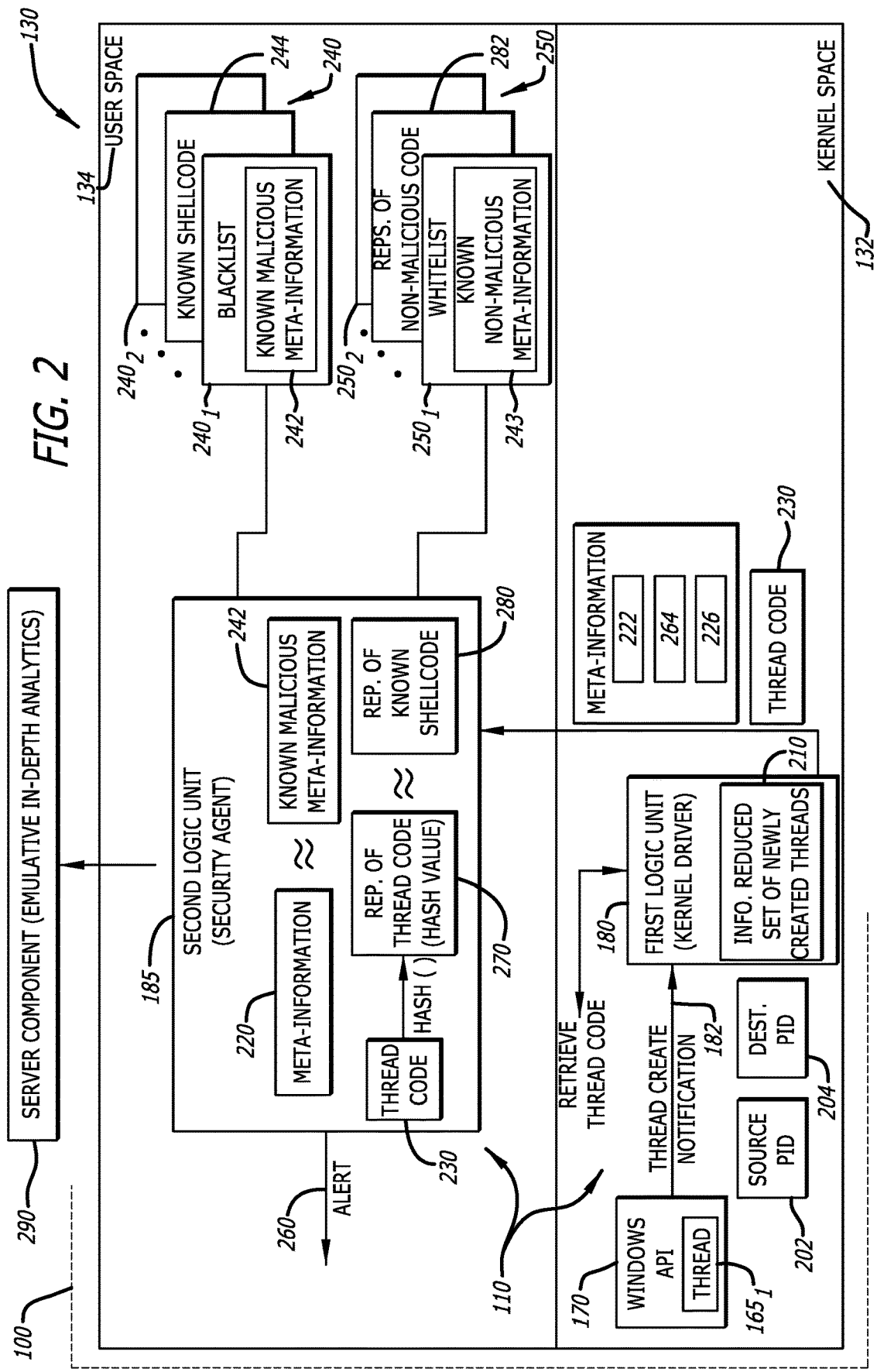
FIG. 2 is an exemplary embodiment of a logical representation of software components of the cyberthreat analytic logic deployed within user space and kernel space of memory within the computing system of FIG. 1A or FIG. 1B.

Referring now to FIG. 2, an exemplary embodiment of a logical representation of software components of the cyberthreat analytic logic 110 is shown, where the software components reside in the kernel space 132 and the user space 134 of the memory 130 implemented within the computing system 100, as shown in FIG. 1A or FIG. 1B. Herein, the cyberthreat analytic logic 110 features the first logic unit 180 operating as a software driver maintained within the kernel space 132 of the memory 130 (kernel driver) and second logic unit 185 operating as a security agent maintained within the user space 134 of the memory 130. The placement of the first logic unit 180 within the kernel space 132 results in improved accuracy and reliability in analytics by controlling execution of the newly created thread to ensure that its corresponding meta-information and/or code is retrieved for use in analyzing whether the thread is associated with malicious code execution, such as malicious remote (code) injection or malicious local reflection. Stated differently, such improved accuracy and reliability is achieved, in part, because execution of the detected, newly created thread $165_1$ (and its corresponding process $160_1$) can be effectively suspended (e.g., paused) to allow the first logic unit 180 to extract meta-information 220 and code 230 associated with the thread $165_1$ as, based on the operability of the Windows® OS, the newly created thread $165_1$ cannot be terminated before termination of operability of the first logic unit 180 (acting as a kernel driver). Analyses of the meta-information 220 and/or code 230, which may constitute shellcode, may assist in the reduction (in number) of false positives (FPs) and false negatives (FNs).

More specifically, as illustrated in FIG. 2, the first logic unit 180 may be configured to register with the Windows® API 170 to receive the thread create notification 182, namely a thread notification callback message that notifies the first logic unit 180 (e.g., Windows® kernel driver) that a new thread has been created to run in a portion of memory allocated to the process $160_1$ while the process $160_1$ is being executed. According to this embodiment of the disclosure, the thread create notification 182 may include information 200 associated with the newly created thread $165_1$ such as, for example, a source process identifier 202 ("source PID") that identifies the source of the newly created thread $165_1$ and a destination PID 204 that identifies the intended destination of the newly created thread $165_1$. The first logic unit 180 is configured to use the source PID 202 and the destination PID 204 for filtering (discarding) received information representative of a subset of the detected, newly created threads $165_1$-$165_N$ that are unlikely associated with malicious code execution.

According to one embodiment of the disclosure, the newly created thread $165_1$ may be loaded into memory associated with (e.g., allocated to) the process $160_1$ through remote (code) injection or local reflection. In particular, the first logic unit 180 may be configured to detect the newly created thread $165_1$ is inserted into memory associated with (e.g., allocated to) the process $160_1$ through remote injection when the source PID 202 associated with the newly created thread $165_1$ differs from its destination PID 204. Similarly, the first logic unit 180 may be configured to detect the newly created thread $165_1$ is created through local reflection when the source PID 202 associated with the newly created thread $165_1$ is the same as its destination PID 204.

As described above, the source PID 202 and the destination PID 204 may be provided as part of the information 200 within the thread create notification 182. From the source PID 202, the first logic unit 180 can further identify whether the newly created thread is a kernel-based thread (i.e., created in the kernel space 132) or a userland-based thread (i.e., a thread created in the user space 134). In particular, the first logic unit 180 is configured to detect whether the newly created thread $165_1$ constitutes a kernel-based thread or a userland-based thread when the source PID 202 is assigned a prescribed value.

Stated differently, upon detecting one or more newly created threads $165_1$-$165_N$, the first logic unit 180 (kernel driver) may be configured to perform one or more filtering operations to potentially discard certain types of threads, thereby generating a reduced set of threads $165_1$-$165_J$ (N≥J≥1) for subsequent analysis. With respect to a first filtering operation, the first logic unit 180 may be configured to concentrate monitoring of the newly created threads $165_1$-$165_N$ based on the locality of its source. As a result, the first logic unit 180 may be configured to monitor for (i) new threads created through remote (code) injection, (ii) new threads created through local reflection, or (iii) new thread created through remote (code) injection or local reflection.

Upon receiving the information 200 within the thread create notification 182, the first logic unit 180 may be further configured to perform a second filtering operation that disregards thread create notifications associated with newly created system threads (e.g., threads generated in the kernel space 132). The thread create notification 182 may identify whether a newly created thread is a system thread when the source PID 204 has a prescribed value (e.g., PID 4 is the Process ID for the Windows® system process). Herein, the first filtering operation and the second filtering operation may be performed sequentially or concurrently.

Additionally, the first logic unit 180 may be configured to gather meta-information 220 associated with each thread of the reduced set of newly created threads 210. The meta-information 220 may include, but is not limited or restricted to (a) information identifying what permissions 222 (read/write/execute) are assigned to a specific newly created thread, (b) a start address 224 for that specific newly created thread, (c) a size of memory 226 allocated to the specific newly created thread, or the like.

In summary, according to one embodiment of the disclosure, the first logic unit 180 may be configured to (i) detect newly created threads, optionally through a Windows-based API 170, (ii) filter certain type(s) of threads (e.g., system threads, threads created through remote injection, threads created through local reflection, etc.) from these detected threads to produce the reduced set of newly created threads 210, and (iii) acquire meta-information 220 associated with each thread of the reduced set of newly created threads 210.

Additionally, as an optional capability, the first logic unit 180 may be configured to obtain code 230 associated with each thread of the reduced set of newly created threads 210 (hereinafter referred to as "thread code" 230). According to one embodiment, the first logic unit 180 may obtain the thread code 230 by performing a memory copy of a region of memory defined by the start address 224 and the thread allocated memory size 226 being part of the meta-information 220. This acquisition of the meta-information 220 and/or thread code 230 is assured based on the deployment of the first logic unit 180 as a kernel driver within the kernel space 132 as described above.

In particular, where the first logic unit 180 is configured to retrieve the thread code 230 and malicious code execution is being conducted, the thread code 230 would correspond to shellcode. Hence, analytics of the shellcode 230 may be conducted to verify whether a newly created thread is or is not associated with a cyberattack through remote injection or local reflection.

Operating in user space 134 and responsible for determining whether the thread $165_1$, as represented by the meta-information 220 and/or the thread code 230 is associated with a cyberattack, the second logic unit (security agent) 185 may be configured to receive the meta-information 220 and optionally the thread code 230. Herein, the second logic unit 185 may be configured to receive the meta-information 220 and optionally the thread code 230 for each filtered, newly created thread successively. Alternatively, the first logic unit 180 may temporarily store the meta-information and/or thread code for multiple detected threads and upload to the second logic unit 185 collectively (e.g., upload information associated with multiple detections at scheduled times or at times when processor utilization is less than a prescribed threshold (e.g., less than 50% utilization, less than 25% utilization, etc.). Herein, description of meta-information and/or thread code uploading for a single thread is discussed, albeit the information may be accompany meta-information and/or thread code for other newly created (and filtered) threads.

According to one embodiment of the disclosure, the security agent 185 conducts one or more analyses of the meta-information 220, where the analyses may include a determination whether a particular level of correlation (e.g., from identical to a selected degree of similarity) exists between one or more portions of the meta-information 220 and known malicious meta-information 242 within one or more blacklists 240. Upon determining that the correlation between the portion(s) of the meta-information 220 and known malicious meta-information 242 within any of the blacklists 240 meets or exceeds the particular level of correlation, the security agent 185 may issue an alert 260 identifying that a malicious code execution event, representative of a cyberattack based on malicious code execution, is being conducted on the computing system 100.

Additionally, as an optional analytic, the security agent 185 may conduct one or more analyses on the thread code 230. The analyses may include (i) performing a transformation of the thread code 230 (e.g., conducting a one-way hash operation) to generate a representation 270 of the thread code 230 (or a portion of the thread code 230) and (ii) determining whether a certain level of correction exists between the representation 270 of the thread code 230 (or a portion of the thread code 230) and representations 280 of known shellcode 244 (or portions of the known shellcode 244). The representations of known shellcode 244 (or portions thereof) may be stored within the one or more blacklists 240. This comparison may be conducted to confirm that the newly created thread associated with the thread code 230 is associated with a cyberattack based on malicious code execution. Herein, according to one embodiment of the disclosure, the representation 270 of the thread code 230 (or a portion of the thread code 230) and representations 280 of the known shellcode (or portions of the known shellcode 244) may be a resultant hash value such as a MD5 or SHA-256 value, a checksum, or another data format having, e.g., a consistent size regardless of the byte size of the thread code 230.

In summary, the security agent 185 conducts analytics to determine whether a suitable level of correlation exists between at least a portion of the collected meta-information 220 and contents within a first blacklist $240_1$ and/or a first whitelist $250_1$. For example, the first blacklist $240_1$ may include the known malicious meta-information 242. The first whitelist $250_1$ may include meta-information 243 associated with known, non-malicious code execution events. Similarly, the security agent 185 may conduct analytics to determine whether a suitable level of correlation exists between the representation 270 of the thread code 230 or a portion thereof (e.g., SHA-256 hash value, MD5 hash value, checksum, etc.) and content within a second blacklist $240_2$ and/or a second whitelist $250_2$. The second blacklist $240_2$ may include representations 282 (one-way hash values) of shellcode (or portions of shellcode) while the second whitelist $250_2$ may include representations 282 (e.g., one-way hash values) of selected code associated with non-malicious code execution events. The code being used to formulate the second whitelist $250_2$ may be determined through machine learning, experiential knowledge, artificial intelligence-based results, or the like.

. However, if the security agent 185 is configured to classify the thread as "suspicious" or indefinite (e.g., the threat classification of the newly created thread cannot yet be confirmed as "malicious" or "benign"), the security agent 185 may be configured to provide the meta-information 220 and the thread code 230 to a centralized system 290 (e.g., third party security server), which is communicatively coupled directly or remotely to the computing system via a network connection. The centralized system 290 is configured to perform an emulation operation or other in-depth analyses on the meta-information 220 (e.g., virtual machine (VM-based) execution or machine-learning analysis) and/or the thread code 230 in order analyze the potential effects to the computing system (or network) caused by execution of the newly created thread. Additionally, the centralized system 290 may perform enrichment operations such as determining additional context with respect to the newly created thread such as whether any malicious domains are present in the thread code 230 and/or determining whether any intelligence in the form of context information can be obtained from the results of static and/or dynamic analyses.

IV. Thread Detection Logic—Architecture and Operability

Figure 3:
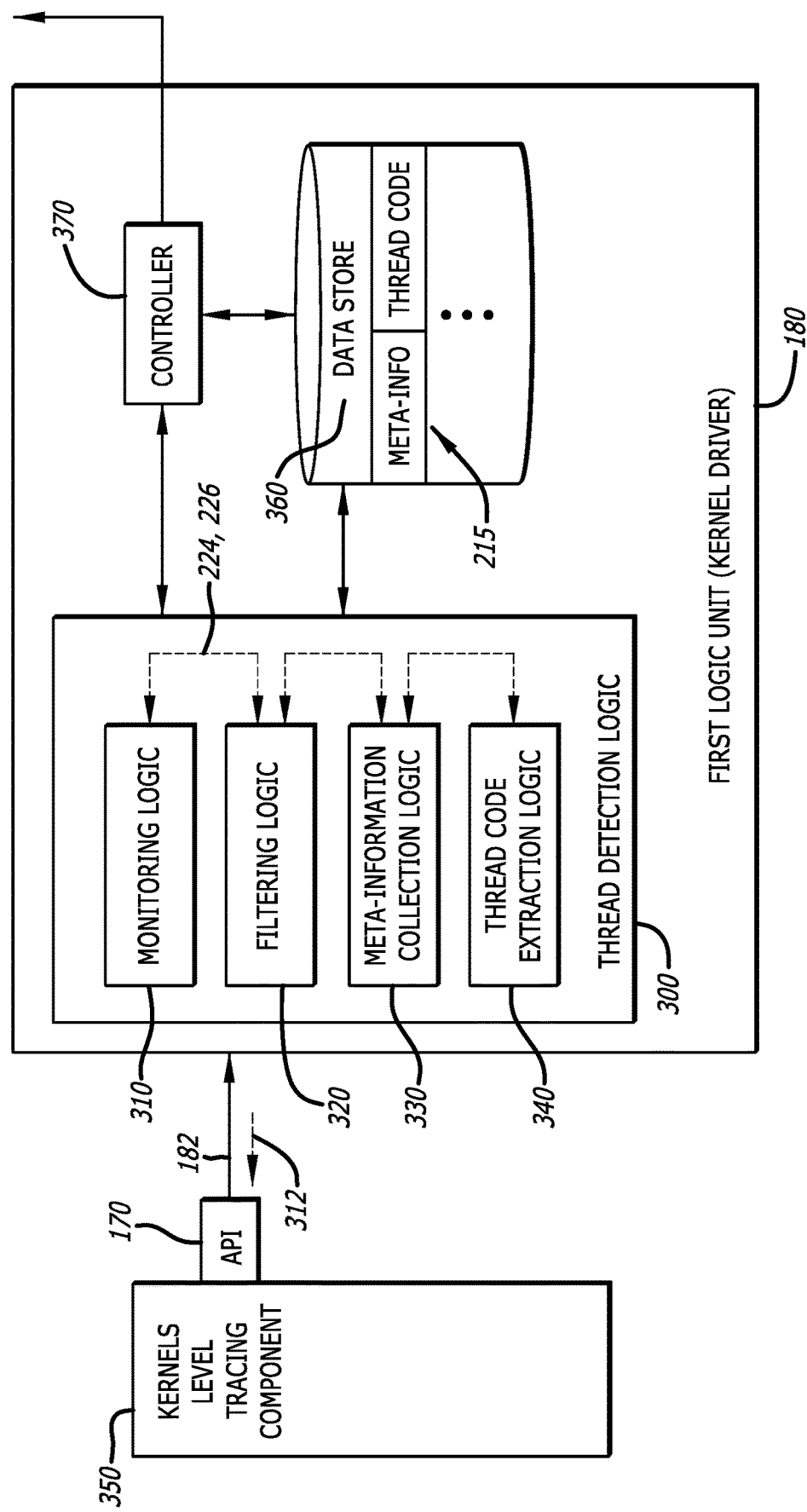
FIG. 3 is an exemplary embodiment of a logical representation of a first logic unit operating as thread detection logic deployed within the kernel space of the memory utilized by the cyberthreat analytic logic of FIG. 1A or FIG. 1B.

Referring to FIG. 3, an exemplary embodiment of a logical representation of the first logic unit 180 operating as part of the cyberthreat analytic logic 110 and deployed within the kernel space 132 of the memory 130 of FIG. 1A (or first region of cloud storage 192 of FIG. 1B) is shown. Operating as a kernel driver, the first logic unit 180 includes thread detection logic 300, which includes monitoring logic 310, filtering logic 320, meta-information collection logic 330, and thread code extraction logic 340. Each of the filtering logic 320, the meta-information collection logic 330 and the thread code extraction logic 340 may operate separately or concurrently with other logic.

Herein, the monitoring logic 310 may be configured to establish communications with kernel-level tracing component 350, which is assessable via the Windows® Thread Creation API 170. The kernel-level tracing component 350 is configured to provide the thread create notification 182 to notify the monitoring logic 310 of a new thread being created during operations of a monitored process. Herein, the monitoring logic 310 may be notified in accordance with a "push" notification scheme in which the kernel-level tracing component 350 sends the thread create notification 182 in response to creation of a new thread by a monitored process. Alternatively, the monitor logic 310 may be notified in accordance with a "pull" notification scheme in which the monitoring logic 310 issues a query message 312 to the kernel-level tracing component 350, which returns one or more thread create notifications 182 corresponding to new threads that are being created and operating as part of the monitored process.

The filtering logic 320 is configured to perform one or more filtering operations to disregard newly created system threads, namely kernel-based threads for example, to maintain information 215 associated with the reduced set of newly created threads within a data store 360. In particular, each of the thread notification callbacks may include information to identify whether a newly created thread associated with that thread notification callback is a kernel-based thread. Given that malicious code execution tends to be perpetrated on userland-based threads, newly created system threads can be discarded, resulting in a lesser number of threads to be evaluated.

The meta-information collection logic 330 is configured to collect the meta-information 220 associated with each of the reduced set of newly created threads 210. For each newly created thread from the reduced set of newly created threads 210, the meta-information 220 may be extracted from information within its corresponding thread create notification 182 and/or information gathered from accessing certain Windows-based data structures (where acquisition is ensured based on deployment and operability of the first logic unit 180 as a kernel driver within the kernel space 132 of the memory 130). As described above, the meta-information 220 may include, but is not limited or restricted to at least (a) permissions 222 assigned to a particular newly created thread, (b) the start address 224, and/or (c) the allocated memory size 226 for the newly created thread.

Herein, the thread code extraction logic 340 is in communication with the meta-information collection logic 330 to receive the start address 224 of the newly created thread and the thread allocated memory size 226, being part of the meta-information 220 obtained by the meta-information collection logic 330, for each newly created thread. Based on this information, the thread code extraction logic 340 conducts a memory copy of the contents within a segment of memory defined by the start address 224 and the thread allocated memory size 226 to acquire the thread code 230. The controller 370 performs (drives) operability of the first logic unit 180.

Figure 4:
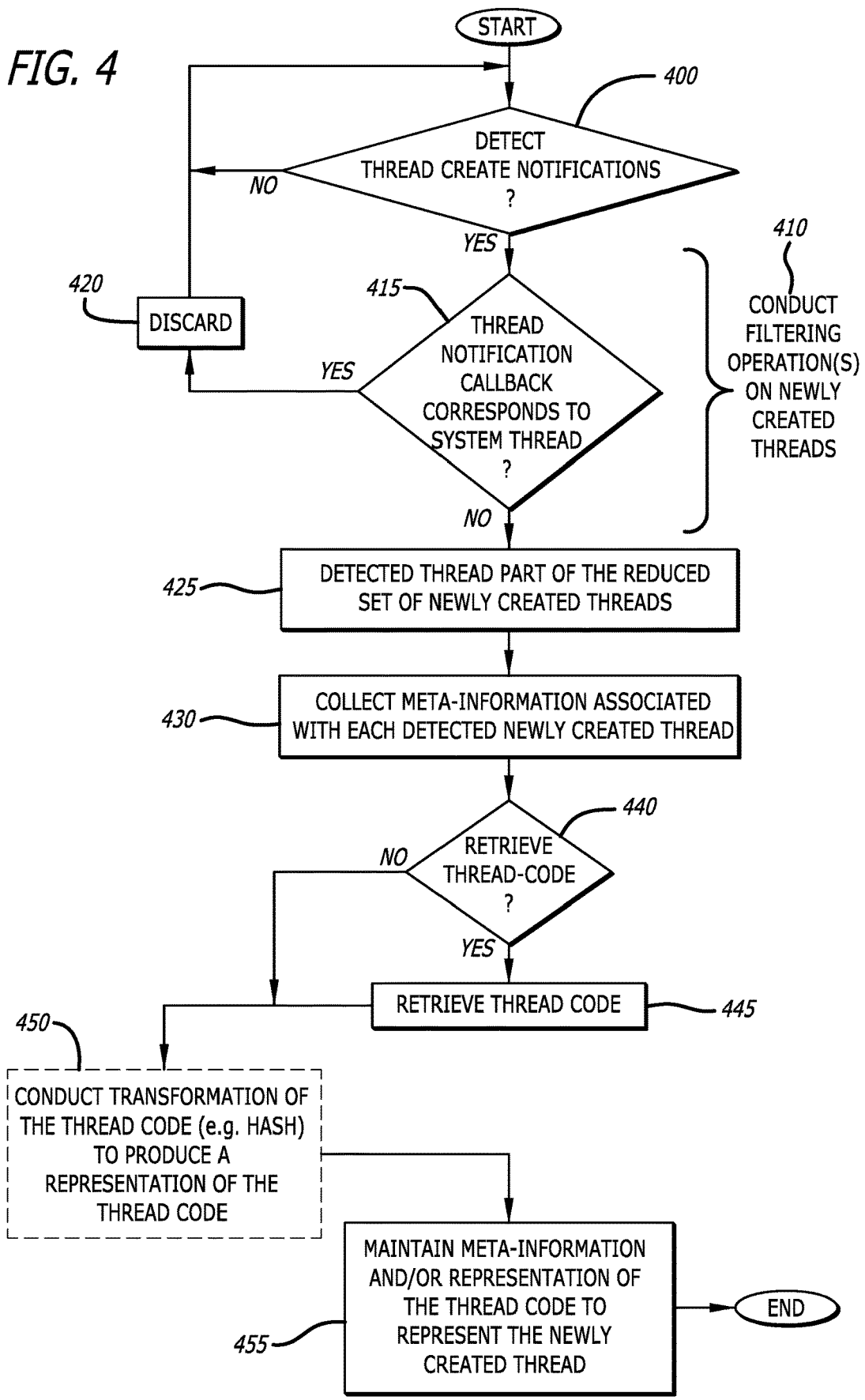
FIG. 4 is an illustrative embodiment of an exemplary flowchart of the operations of the thread detection logic of FIG. 3.

Referring now to FIG. 4, an illustrative embodiment of an exemplary flowchart of the operations of the thread detection logic 300, implemented as part of the first logic unit 180 of FIG. 3, is shown. Herein, the thread detection logic continues to monitor for thread create notifications that signifies creation of a new thread during execution of a process (operations 400). During receipt of the thread create notifications, the thread detection logic conducts a filtering operation to concentrate on newly created threads with a greater likelihood of being associated with a cyberattack involving malicious code execution (operation 410). An example of the filtering operations includes determining whether the thread notification callback corresponds to a newly created system thread (operation 415). If so, the newly created thread may be discarded (operation 420). Based on the filtering operations, a reduced set of newly created threads are selected for analysis (operation 425).

For each of the newly created threads, meta-information associated with the newly created threads is collected (operation 430). The particular meta-information to be collected may be pre-selected (e.g., manufacturer set), configurable (e.g., selected) by a security administrator, or a combination where certain meta-information that is considered essential for malicious code execution analytics (e.g., starting address, thread memory allocation size, etc.) is pre-selected while other meta-information may be retrieved as selected by the security administrator (or user). Also, provided retrieval of the thread code is desired, using a portion of the collected meta-information, the thread code associated with the newly created thread may be recovered (operations 440 and 445). Optionally, as shown in FIG. 4, a transformation of the thread code may be conducted to produce a representation of the thread code (e.g., generate a hash value constituting a representation of the thread code).

Therefore, the meta-information and optionally the thread code is provided to the security agent residing in the user space (operation 460). The agent is configured to conduct analytics on the meta-information and/or thread code to determine whether the newly created thread is associated with a malicious code execution cyberattack.

V. Security Agent—Architecture and Operability

Figure 5:
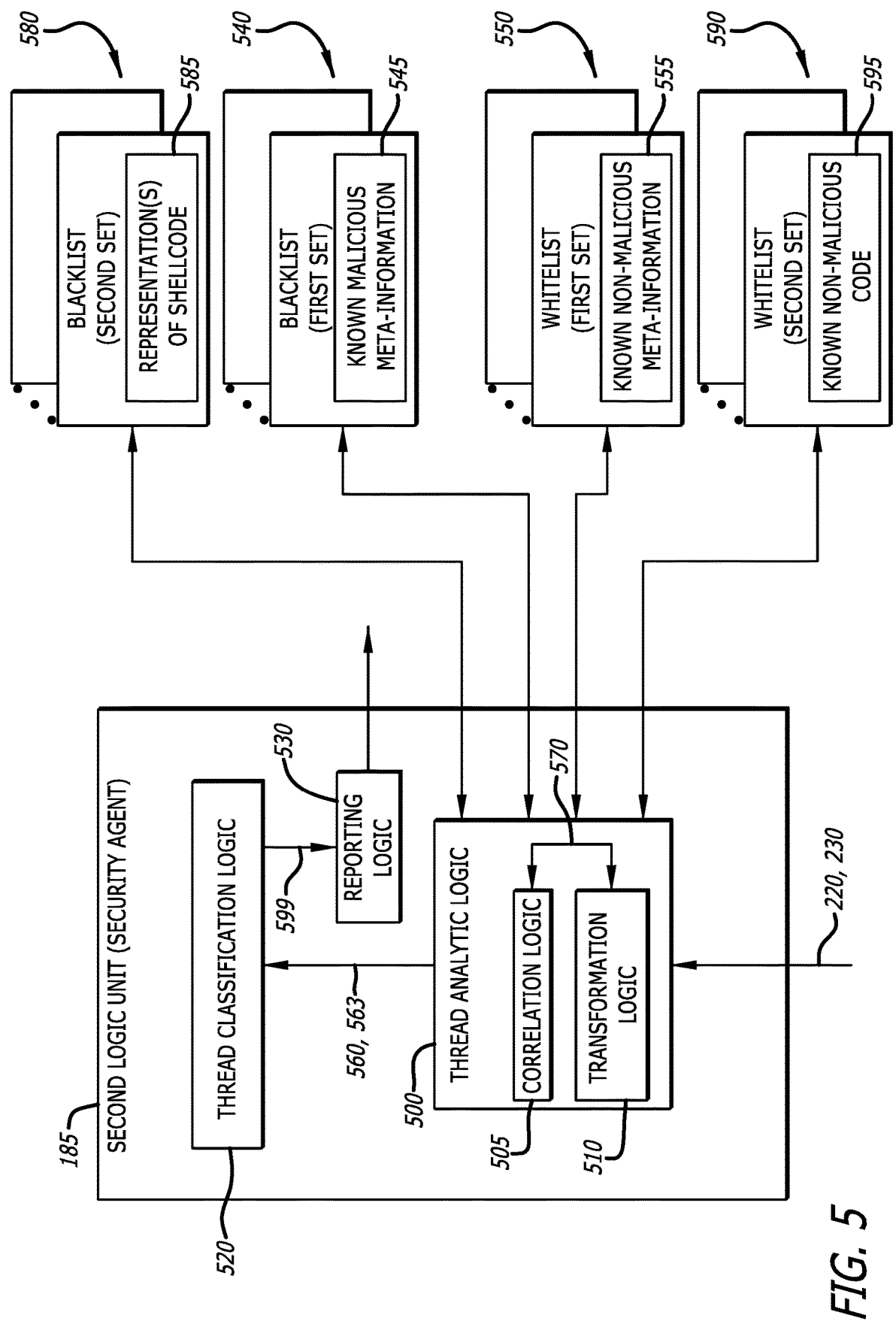
FIG. 5 is an exemplary embodiment of a logical representation of thread analytic logic deployed within the user space of the memory utilized by the cyberthreat analytic logic of FIG. 1A or FIG. 1B.

Referring to FIG. 5, an exemplary embodiment of a logical representation of the second logic unit 185 of FIG. 1A or FIG. 1B is shown. Operating as a security agent, for this embodiment, the second logic unit 185 includes thread analytic logic 500, thread classification logic 520 and reporting logic 530. The thread analytic logic 500 is configured to receive the meta-information 220 and/or the thread code 230 related to a suspicious thread from the first logic unit (kernel driver) 180. The thread analytic logic 500 conducts analyses of the meta-information 220 and/or the thread code 230 to determine whether the newly created thread is associated with a cyberattack based on malicious code execution.

More specifically, the thread analytic logic 500 may include correlation logic 505, which is configured to conduct one or more analyses associated with the meta-information 220 to determine whether a correlation exists between a portion of the meta-information 220 and contents maintained within the blacklists 240, which include a first set (one or more) of blacklists 540 and/or a first set of whitelists 550. For example, the thread analytic logic 500 is configured to (i) access the first set of blacklists 540, which includes meta-information 545 associated with known malicious code execution events, and (ii) conduct one or more analyses to determine a level of correlation between the meta-information 220 and the meta-information 545 maintained within the first set of blacklist 540. This level of correlation, referred to as a first threat score 560 (e.g., ranging from 0→100), may be provided to the thread classification logic 520. Albeit, in lieu of determining a level of correlation based on scoring, it is contemplated that the level of correlation may be determined based on a degree of compliance and/or non-compliance with a set of rules that may be formulated to identify meta-information associated with known malicious code execution events.

Similarly, whitelists 250 may be utilized. More specifically, the thread analytic logic 500 may be configured to (i) access the first set of whitelist 550, which includes meta-information 555 associated with known, non-malicious code execution events, and (ii) conduct one or more analyses to determine a level of correlation between the meta-information 220 and the meta-information 555 maintained within the first set of whitelists 550. This level of correlation, referred to as a second threat score 561, which may be calibrated differently than the first threat score 560 (e.g., ranging from 100→0), may be provided to the classification logic 520. As stated above, in lieu of determining a level of correlation based on scoring, it is contemplated that the level of correlation may be determined based on a degree of compliance and/or non-compliance with another set of rules that may be formulated to identify meta-information associated with known non-malicious code execution events.

Additionally, the thread analytic logic 500 may further conduct one or more analyses pertaining to the thread code 230, which assists in determining whether the newly created thread is associated with a cyberattack based on malicious (position-independent) code execution. Herein, the thread analytic logic 500 includes transformation logic 510 that is configured to receive the thread code 230 and conduct one or more operations on the thread code 230 to generate a representation 570 of the thread code 230. Herein, the representation 570 of the thread code 230 may correspond to a hash value generated from the thread code 230 or a portion of the thread code 230 such as a SHA-256 hash value or an MD5 hash value. As an alternative, the representation 570 of the thread code 230 may correspond to an extracted portion of the thread code 230 or a checksum of the thread code 230.

For this embodiment, the extracted portion of the thread code 230 may be selected based on machine learning, experiential knowledge, artificial intelligence-based results, or the like.

Thereafter, the thread analytic logic 500 conducts one or more analyses associated with the representation 570 to determine a level of correlation between the representation 570 and contents maintained within a second set of blacklist 580 and/or a second set of whitelist 560. In particular, the thread analytic logic 500 is configured to (i) access the second set of blacklists 580, which includes representation 585 of shellcode pertaining to malicious code execution, and (ii) conduct one or more analyses to determine a level of correlation between the representation 570 and representations 585 maintained within the second set of blacklists 580. This level of correlation, such a third threat score 562 (e.g., ranging from 0→100) or a degree of compliance and/or non-compliance with a chosen rule set for example, may be provided to the classification logic 520.

Also, the thread analytic logic 500 is configured to (i) access the second set of whitelists 590, which includes representations 595 associated with definitive, non-malicious thread code, and (ii) conduct one or more analyses to determine a level of correlation between the representation 570 and representations 595 maintained within the second set of whitelists 590. This level of correlation, such as a fourth threat score 563, which may be calibrated differently than the third threat score 562 (e.g., ranging from 100→0) or measured based on compliance and/or non-compliance with another rule set, may be provided to the classification logic 520.

As further shown in FIG. 5, the classification logic 520 receives analytic results (threat scores 560-563) from the thread analytic logic 500 and generates a final threat score based on these analytic results. According to one embodiment, the final threat score may be an aggregation of any combination of threat scores (e.g., threat scores 560 and 562) determined separately in connection with determined levels of correlation between (i) the meta-information 220 with meta-information associated with threads associated with known malicious code execution events and/or known non-malicious code execution events and//or (ii) the representation 570 of the thread code 230 and representations associated with shellcode and/or definitive, non-malicious thread code. Alternatively, the final threat score may be a weighted aggregation or an average between the threat scores 560-563, or a maximum threat score of these two threat scores. The classification logic 520 determines whether the newly created thread is malicious or non-malicious based on the final threat score.

Herein, where the newly created thread is deemed malicious based on the final threat score determined from the meta-information 220 and/or the thread code 230, the classification logic 520 may provide information 599 to the reporting logic 530 that identifies an assigned classification for the thread under analysis. For instance, when the final threat score determined the classification logic 520 exceeds a first threshold that denotes the newly created thread is malicious, the reporting logic 530 may receive information that causes the reporting logic 530 to issue the alert 260 that triggers an automated remediation of the newly created thread by terminating the process associated with the malicious thread (or blocking further activities by the malicious thread). However, where the final threat score assigned by the classification logic 520 exceeds a second threshold (less than the first threshold but still that denotes the thread is malicious), the reporting logic 530 may issue an alert that causes a dashboard warning and prompts an analyst to immediately review the results and determine whether to conduct a remediation operation on the malicious thread. However, where the final threat score assigned by the classification logic 520 exceeds a third threshold (less than the second threshold but still that denotes the thread is malicious), reporting logic 530 may issue an alert that causes the dashboard warning on the endpoint device (and/or another endpoint device), where remediation is determined by an administrator based on security protocols to be followed by the user of the endpoint device.

VI. Cyberthreat Analytic Logic—Flow of Operation

Figure 6A:
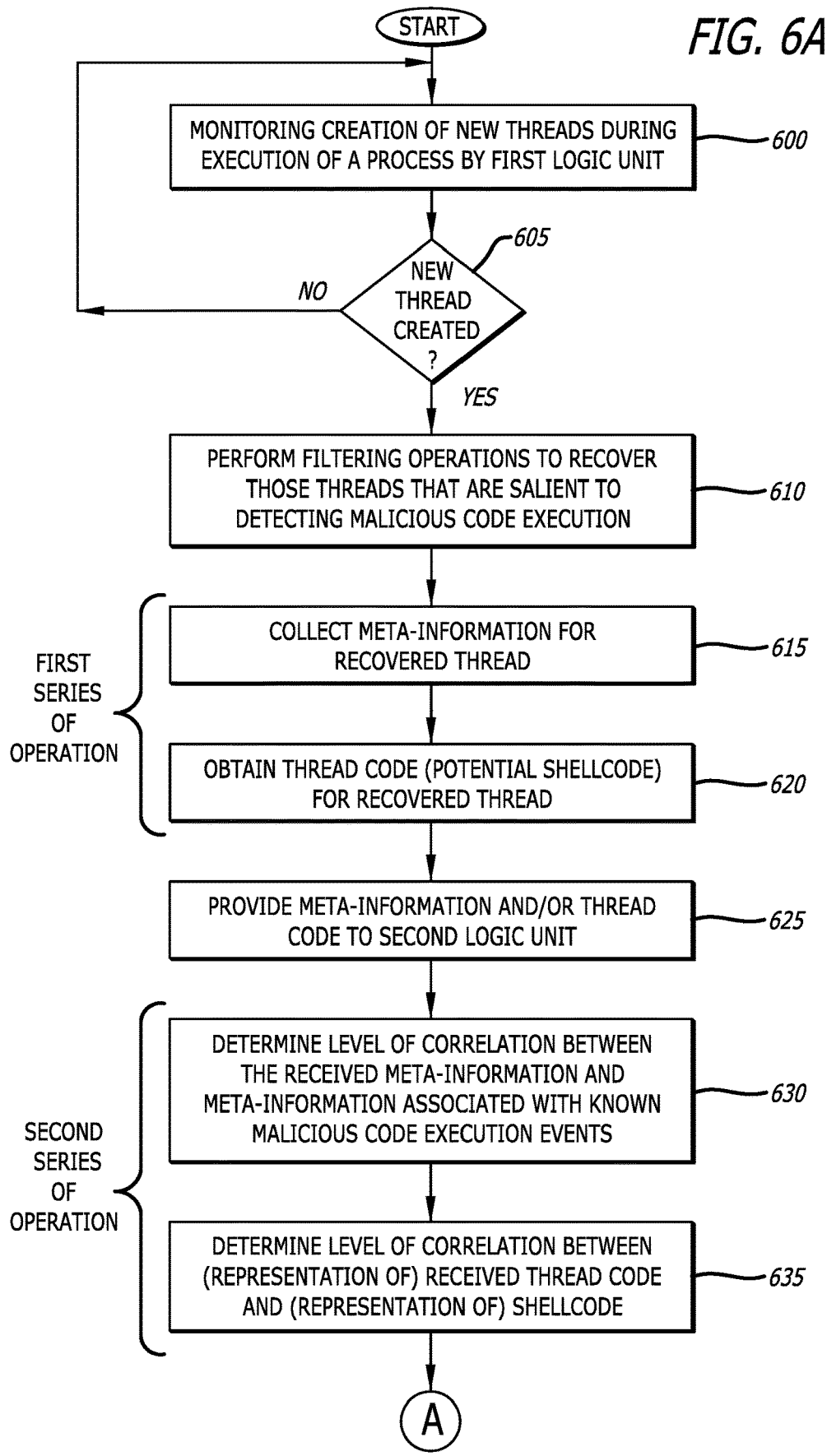
FIGS. 6A-6B are an illustrative embodiment of an exemplary flowchart of the operations performed by the cyberthreat analytic logic of FIG. 1A or FIG. 1B.
Figure 6B:
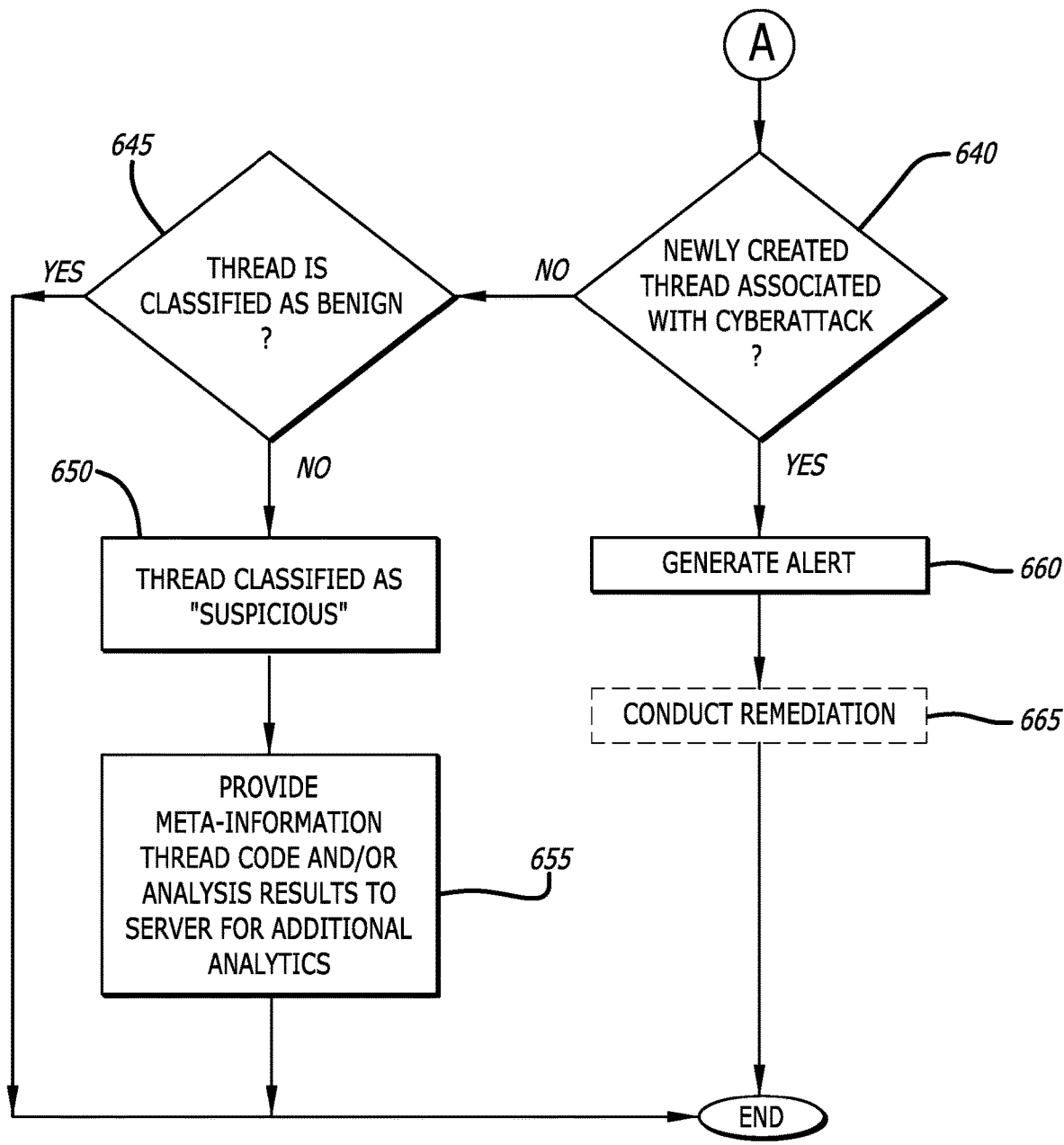

Referring now to FIGS. 6A-6B, an illustrative embodiment of an exemplary flowchart of the operations performed by the cyberthreat analytic logic 110 of FIG. 1A or FIG. 1B is shown. Herein, a first series of operations is conducted by the first logic unit, such as a kernel driver being part of the cyberthreat analytic logic for example. The creation of new threads for one or more processes executing on a computing system may be monitored (operation 600). As the newly created threads are detected, one or more filtering operations may be conducted on the detected, newly created threads (operation 605). The filtering operations are performed to recover a reduced set of newly created threads (operation 610). The reduced set of newly created threads excludes system threads from subsequent analysis as to whether the newly created threads are associated with a cyberattack based on malicious code execution.

For each (filtered) thread of the reduced set of newly created threads, meta-information associated with each of these detected threads is collected (operation 615). The meta-information may include thread characteristics such as the locality of the creation of that thread (e.g., DLL location versus a user allocated memory), access permissions, thread memory allocation size for the thread, starting address for memory allocated for the thread, or the like. Additionally, using a portion of the collected meta-information, the code associated with the newly created thread (e.g., thread code) may be obtained (operation 620). The meta-information and/or the thread code is provided to the second logic unit that conducts non-behavioral analyses of the meta-information (operation 625). The non-behavioral analyses corresponds to analyses that can be performed without execution of the thread and monitoring behaviors of the thread or process associated with the thread.

According to one embodiment of the disclosure, a second series of operations is conducted by the second logic unit, such as a security agent being part of the cyberthreat analytic logic for example. Herein, for this embodiment of the disclosure, the second series of operations includes the non-behavioral analyses, where the second logic unit is determining the level of correlation between the received meta-information and meta-information associated with known malicious code execution events (operation 630). Additionally, or as an optional analytic, the level of correlation between a representation of the received thread code and a plurality of representations of shellcode associated with known malicious code execution events may be determined (operation 635).

Thereafter, based on the levels (or level) of correlation determined, represented by the threat scores (or threat score) according to one embodiment of the disclosure, a determination is made whether the newly created thread is associated with a cyberattack based on malicious code execution (operation 640). Depending on the levels of correlation (threat scores) determined, the newly created thread may be classified as "malicious," "benign," or "suspicious," which may prompt additional analytics (e.g., emulation, behavioral analysis, etc.) remotely from the computing system (operations 645-655). Where the newly created thread is determined to be associated with a cyberattack based on malicious code execution (e.g., thread deemed malicious), an alert is generated and, optionally, a remediation scheme to initiate (operations 660-665). The type and/or user involvement in the selection of a particular remediation scheme (e.g., automated, administrator-based, etc.) may be based, at least in part, on the values of the threat scores. For instance, where the threat score exceeds a threshold that definitively classifies the thread as part of a cyberattack, the remediation scheme is automated without any administrator participation. As the threat score diminishes, the administrator (for the endpoint or cloud service) may have greater input as to the type and/or degree of remediation (e.g., blocking, quarantining, continued process with heightened controls as to communications over a public network (e.g., reduced to local area network, reduced to only certain approved web or email servers, etc.).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system, comprising:
one or more processors; and
a memory communicatively coupled to the one or more processors, the memory including a first memory region operating as a kernel space and a second memory region operating as a user space, the memory comprises
a first logic unit maintained within the kernel space, the first logic unit to (i) receive a thread creation notification via an Application Programming Interface identifying a newly created thread, (ii) determine a thread type associated with the newly created thread to determine whether the newly created thread is a filtered thread type of one or more filtered thread types, and (iii) extract, within the kernel space, at least meta-information associated with the newly created thread included as part of the threat creation notification, provided the newly created thread is a thread type other than the one or more filtered thread types, and
a second logic unit maintained within the user space, the second logic unit to receive at least the meta-information associated with the newly created thread and conduct analytics on at least the meta-information to attempt to classify the newly created thread,
wherein an alert is generated by the second logic unit upon classifying the newly created thread as a cyberattack associated with a malicious position independent code execution based at least on results of the analytics associated with the meta-information associated with the newly created thread.

2. The system of claim 1, wherein the malicious position independent code execution corresponding to either (i) a malicious remote injection in which malicious code associated with the newly created thread is inserted into a process that includes the newly created thread or (ii) a malicious local reflection in which a malicious thread is created and invoked by the process that includes the newly created thread.

3. The system of claim 1, wherein the filtered thread type of the one or more filtered thread types includes a system thread being a thread generated in the kernel space and the first logic unit is configured to detect newly created threads and filter threads being any of the one or more filtered thread types to produce a reduced set of newly created threads including the newly created thread.

4. The system of claim 1, wherein the second logic unit to conduct the analytics on the meta-information associated with the newly created thread by determining whether at least a particular level of correlation exists between the meta-information and meta-information associated with known malicious code execution events.

5. The system of claim 1, wherein the one or more filtered threads includes one or more threads created in the kernel space, one or more threads created through remote injection, or one or more threads created through local reflection.

6. The system of claim 1, wherein the first logic unit further extracting thread code associated with the newly created thread and the second logic unit to conduct the analytics on the meta-information associated with the newly created thread by determining whether at least a first level of correlation exists between the meta-information and meta-information associated with known malicious code execution events or a second level of correlation exists between a representation of the thread code and a representation of shellcode.

7. The system of claim 6, wherein the representation of the thread code includes at least a hash value of at least a portion of the thread code and the representation of the shellcode includes at least a hash value of at least a portion of the shellcode.

8. The system of claim 7, wherein the second logic unit to provide at least the meta-information associated with the newly created thread and the thread code associated with the newly created thread to a centralized system that performs an emulation operation or other in-depth analyses on at least one of the meta-information associated with the newly created thread or the thread code associated with the newly created thread in order to analyze potential effects caused by execution of the newly created thread by the computing system.

9. The system of claim 1, wherein the system is operating as a cloud service with the one or more processors corresponding to one or more virtual processors.

10. A non-transitory storage medium including code including a first logic unit to operate in a kernel space of a memory and a second logic unit configured to operate in a user space of the memory that, upon execution by one or more processors, performs operations comprising:
receiving, by the first logic unit via an Application Programming Interface, a notification identifying a newly created thread;
determining a thread type associated with the newly created thread to determine whether the newly created thread is a predetermined thread type;
extracting, by the first logic unit operating within the kernel space, at least meta-information associated with the newly created thread included as part of the notification when the newly created thread is a thread type other than the predetermined thread type;
receiving, by the second logic unit, at least the meta-information associated with the newly created thread;
conducting, by the second logic unit, analytics on at least the meta-information to attempt to classify the newly created thread; and
issuing an alert, as generated by the second logic unit, upon classifying the newly created thread as a cyber-attack associated with a malicious position independent code execution based at least on results of the analytics associated with the meta-information associated with the newly created thread.

11. The non-transitory storage medium of claim 10, wherein the malicious position independent code execution corresponding to either (i) a malicious remote injection in which malicious code associated with the newly created thread is inserted into a process that includes the newly created thread or (ii) a malicious local reflection in which a malicious thread is created and invoked by the process.

12. The transitory storage medium of claim 10, wherein the determining of the thread type associated with the newly created thread comprises determining whether the newly created thread is a thread created in the kernel space, a thread created through remote injection, or a thread created through local reflection.

13. The transitory storage medium of claim 10, wherein the conducting of the analytics on the meta-information associated with the newly created thread comprises determining whether at least a particular level of correlation exists between the meta-information and meta-information associated with known malicious code execution events.

14. The transitory storage medium of claim 10, wherein the first logic unit of the code, upon execution by the one or more processors, further comprises extracting thread code associated with the newly created thread.

15. The transitory storage medium of claim 14, wherein the second logic unit of the code, upon execution by the one or more processors, conducting of the analytics on the meta-information associated with the newly created thread by at least determining whether at least a first level of correlation exists between the meta-information and meta-information associated with known malicious code execution events or a second level of correlation exists between a representation of the thread code and a representation of shellcode.

16. The transitory storage medium of claim 15, wherein the representation of the thread code includes at least a hash value of at least a portion of the thread code and the representation of the shellcode includes at least a hash value of at least portion of the shellcode.

17. The transitory storage medium of claim 16, wherein the second logic unit, upon execution by the one or more processors, to provide at least the meta-information associated with the newly created thread and the thread code associated with the newly created thread to a centralized system that performs an emulation operation or other in-depth analyses on at least one of the meta-information associated with the newly created thread or the thread code associated with the newly created thread in order to analyze potential effects caused by execution of the newly created thread by the computing system.

18. The transitory storage medium of claim 16, wherein the second logic unit, upon execution by the one or more processors, to provide at least the meta-information associated with the newly created thread and the thread code associated with the newly created thread to a centralized system to perform enrichment operations to determine additional context with respect to the newly created thread.

19. The transitory storage medium of claim 10 and the one or more processors being deployed within a cloud service with the one or more processors corresponding to one or more virtual processors.

20. A method for detecting malicious position independent code execution, the method comprising:
- receiving, via an Application Programming Interface, a notification identifying a newly created thread by a first logic unit stored within a kernel space of a memory;
- determining a thread type associated with the newly created thread to determine whether the newly created thread is a predetermined thread type, wherein the predetermined thread type includes a thread created in the kernel space;
- extracting, by the first logic unit operating within the kernel space, at least meta-information associated with the newly created thread included as part of the notification when the newly created thread is a thread type other than the predetermined thread type;
- receiving at least the meta-information associated with the newly created thread by a second logic unit stored within user space of the memory;
- conducting analytics on at least the meta-information by the second logic unit to attempt to classify the newly created thread; and
- issuing an alert, as generated by the second logic unit, upon classifying the newly created thread as a cyber-attack associated with the malicious position independent code execution based at least on results of the analytics associated with the meta-information associated with the newly created thread.

21. The method of claim 20, wherein the malicious position independent code execution corresponding to either a malicious remote injection in which malicious code associated with the newly created thread is inserted into a process that includes the newly created thread or a malicious local reflection in which a malicious thread is created and invoked by the process that includes the newly created thread.

* * * * *